United States Patent

Carney

(10) Patent No.: US 10,436,616 B2
(45) Date of Patent: Oct. 8, 2019

(54) PASSIVE MONITORING OF SENSOR CALIBRATION STATUS

(71) Applicant: HAMILTON SUNDSTRAND CORPORATION, Charlotte, NC (US)

(72) Inventor: Kenneth Carney, Rancho Cucamonga, CA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 240 days.

(21) Appl. No.: 15/230,886

(22) Filed: Aug. 8, 2016

(65) Prior Publication Data

US 2018/0038718 A1 Feb. 8, 2018

(51) Int. Cl.
*G01D 18/00* (2006.01)

(52) U.S. Cl.
CPC ............................. *G01D 18/006* (2013.01)

(58) Field of Classification Search
CPC ............................. G01D 18/00; G01N 27/4163
See application file for complete search history.

(56) References Cited

U.S. PATENT DOCUMENTS

| 5,394,341 | A | * | 2/1995 | Kepner | G01D 3/08 324/537 |
| 5,716,506 | A | * | 2/1998 | Maclay | G01N 27/404 204/424 |
| 6,428,684 | B1 | * | 8/2002 | Warburton | G01N 27/4163 204/401 |
| 6,629,444 | B2 | * | 10/2003 | Peng | G01N 27/4163 73/1.06 |
| 2008/0251379 | A1 | * | 10/2008 | Mayer | G01N 27/404 204/406 |
| 2010/0241340 | A1 | * | 9/2010 | Weber | F01N 11/00 701/109 |
| 2013/0192332 | A1 | | 8/2013 | Scheffler et al. | |
| 2014/0244198 | A1 | * | 8/2014 | Mayer | G01N 33/0006 702/104 |

* cited by examiner

Primary Examiner — Manuel L Barbee
(74) Attorney, Agent, or Firm — Carlson, Gaskey & Olds, P.C.

(57) ABSTRACT

A system has at least one sensor and a control for analyzing a signal from the sensor. The sensor is operable to send a signal indicative of a presence of a particular occurrence to the control. The sensor also sends a background signal even without the presence of the particular occurrence. The control evaluates the background signal to identify a need for calibration. A method is also disclosed.

15 Claims, 1 Drawing Sheet

PASSIVE MONITORING OF SENSOR CALIBRATION STATUS

STATEMENT REGARDING FEDERALLY SPONSORED RESEARCH OR DEVELOPMENT

This invention was made with government support under Contract No. N00024-13-C-2128, awarded by the United States Navy. The Government has certain rights in this invention.

BACKGROUND OF THE INVENTION

This application relates to a method and system for determining when a sensor is in need of calibration.

Sensors are utilized in any number of applications and monitor conditions within an environment.

As an example, chemical sensors may be placed in an occupied area and utilized to identify the presence of undesirable chemicals in the air. Such sensors respond to the presence of a particular substance and send a warning signal.

There may be a number of sensors in an area. Sensors typically require calibration periodically. In general, a time period between calibrations has been selected to be conservative.

Thus, the sensors tend to be calibrated too frequently, and before they need calibration. In an environment with a large number of sensors, this can be quite time-consuming and costly.

It has been proposed to determine the quality of a sensor's condition with an active system. Such an active system would expose a sensor on a controlled basis to the occurrence that it is intended to sense. The response to that exposure is then monitored. If the response is not as predicted, then an indication can be made that the sensor is in need of calibration.

However, such an active system is relatively complicated. This is especially true when there are a large number of sensors in a particular environment.

SUMMARY OF THE INVENTION

A system has at least one sensor and a control for analyzing a signal from the sensor. The sensor is operable to send a signal indicative of a presence of a particular occurrence to the control. The sensor also sends a background signal even without the presence of the particular occurrence. The control evaluates the background signal to identify a need for calibration.

A method is also disclosed.

These and other features may be best understood from the following drawings and specification.

DETAILED DESCRIPTION

Figure 1:
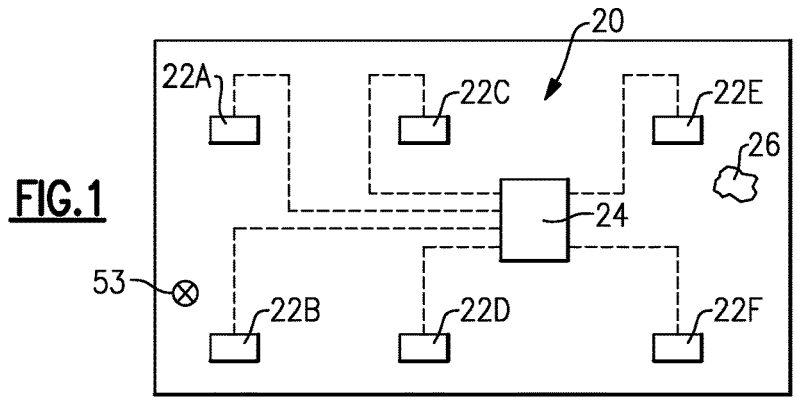
FIG. 1 schematically shows a system.

FIG. 1 shows an environment 20 incorporating a plurality of sensors 22A, B, C, D, E, and F. These may be chemical sensors which are intended to sense the presence of a particular chemical shown schematically at 26. When the particular chemical 26, known as an analyte, is sensed, a signal is sent to a control 24.

While chemical sensors are disclosed, the methods and systems of this disclosure extend to many other type sensors, sensing other occurrences.

Even without the presence of a chemical 26, each sensor typically sends a signal which may be called a "background signal" for purposes of this application. The background signal would theoretically be zero, as there is no analyte sensed. However, in practice, the background signal is typically offset from zero. It also typically has noise and periodically may include spikes.

This application analyzes the background signal to reach an indication that a particular sensor is approaching a need for calibration.

Figure 2:
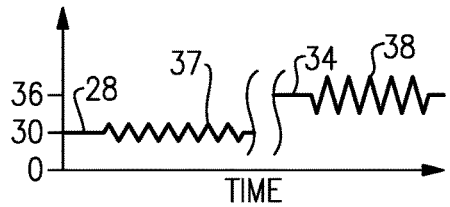
FIG. 2 shows a first embodiment.

As an example, FIG. 2 shows an embodiment that may look at the offset of a signal 28. The offset is shown at 30 at a first point in time. A second signal 34 at a later point in time now has an offset at 36.

This increase in the offset is indicative of a need for calibration. This embodiment may look at the amount of change between 30 and 36 or simply compare the value of 36 to a limit.

In addition, the background signal 28 would have some "noise" shown at 37 at the earlier point in time. That noise is shown at a later point in time in signal 34 having increased at 38. Here again, this increase in noise is indicative of a need for calibration. The increase in noise could be compared to the earlier noise 37 or the amplitude of noise 38 could simply be compared to a limit.

Figure 3:
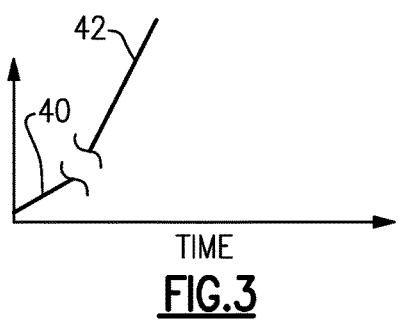
FIG. 3 shows a second embodiment.

FIG. 3 shows another embodiment wherein the offset increases over time at a predictable rate shown at 40. However, at a later point in time, the offset is increasing at a higher slope shown at 42. Both slopes are indicative of a reality known as "drift rate."

This increase in the drift rate of the offset is indicative of the need for calibration. Again, it may be the amount of change that is considered or the slope at 42 may be compared to a selected limit.

Figure 4:
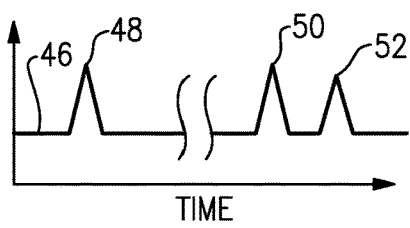
FIG. 4 shows another embodiment.

FIG. 4 shows yet another embodiment. In the background signal 46, there will be occasional noise spikes 48. Such spikes may occur, for example, when an electrochemical sensor becomes desiccated or a capillary orifice becomes partially obstructed or for any number of other reasons.

Thus, the number or frequency of spikes 48 at an earlier time is compared to the number or frequency of the spikes shown at 50 and 52 at a later point in time. An increase in the number of noise spikes is indicative of a need to calibrate a particular sensor. Once again, it may be the amount of increase or simply the number of noise spikes at the later point in time compared to a limit which is indicative of a need to calibrate.

Figure 5:
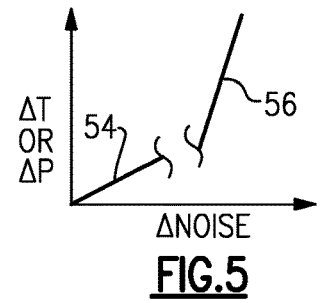
FIG. 5 shows another embodiment.

FIG. 5 shows an embodiment wherein a sensor shown at 53 in FIG. 1 monitors a condition of the environment 20. As an example, the sensor may sense the ambient temperature or air pressure. Those conditions will have an effect on sensor response. Thus, the passive monitoring may be monitoring a change in noise (either its amplitude or frequency, as examples) with a corresponding change in pressure temperature. If the amount of change in the noise for a given change in the ambient condition drifts, this can be indicative of a need for calibration. Thus, a slope 54 may be monitored, and when the slope at 56 has changed dramatically, a decision may be made that the calibration is in order.

Figure 6:
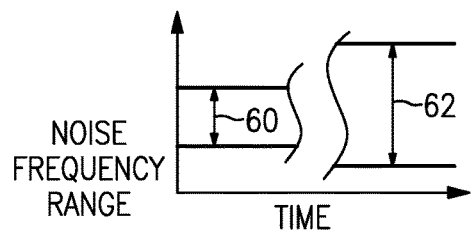
FIG. 6 shows another embodiment.

FIG. 6 shows another embodiment. It should be understood that the background signal or noise is not at a single frequency, but is across a range of frequencies. If the range of frequencies changes dramatically, this can be taken as an indication that calibration is in order.

Thus, a frequency variation in the noise across a range 60 may be sensed at an earlier time. When that range has increased as shown at 62, a decision may be made that calibration is in order.

By passively monitoring the background noise of each of the sensors, this disclosure limits the frequency for calibration compared to the prior art and does so in a very efficient manner.

When a decision has been made that calibration is in order, the control 24 may provide an alert to a maintenance location.

Figure 7:
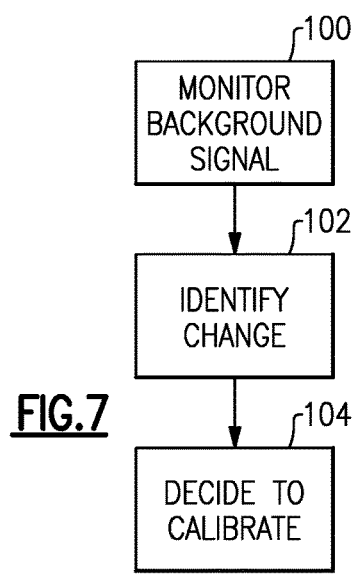
FIG. 7 is a flow chart.

As shown in FIG. 7, a method according to this disclosure may be described in step 100 by monitoring a background signal of a particular sensor. At step 102, a change in that background signal could be identified. At step 104, a decision to calibrate a particular sensor may be made based upon the identified change.

Sensor calibrations may include a term or terms describing a sensitivity of changes in sensor output to changes in chemical concentration. In addition, the calibration will include a constant term that represents a background signal at the time of calibration. It may occur that the constant term is changed without a calibration per se. This is a process often referred to as "re-zeroing," so that an apparent output is zero when no chemical is present. Interim adjustment of this constant may be considered trivial, and outside of what is referred to in this disclosure as "recalibration." The term "recalibration" should be understood to include not only adjusting the constant, but also to adjusting sensitivity of an output signal to changes in a chemical concentration.

In addition, it should be understood that under certain conditions the disclosed system may predict that a calibration is needed when in fact, a sensor may be beyond its useful life. As an example, the movement of the background signal relative to that which is expected may be so great that there may be a decision that the sensor should actually be replaced. Still, such a decision may come within the scope of this disclosure.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A system comprising:
a plurality of sensors for sensing the presence of a chemical and a control for analyzing a signal from said sensors, said sensors being operable to send an occurrence signal indicative of a presence of a particular chemical to said control, and said sensors also sending a background signal to said control even without the presence of the particular chemical; and
said control evaluating said occurrence signal to identify the presence of the particular chemical, and evaluating said background signal to identify a need for calibration wherein a change in said background signal is monitored to identify the need for calibration and wherein said control monitors noise in said background signal and a change in said noise to identify said need for calibration.

2. The system as set forth in claim 1, wherein said background signal has an offset and the change in the offset is monitored over time to determine the need for calibration.

3. The system as set forth in claim 2, wherein said offset changes over time and said control evaluates the rate of change and identifies the need for calibration when the rate of change increases.

4. The system as set forth in claim 2, wherein said control compares the offset to a limit and identifies the need for calibration should said offset be above said limit.

5. The system as set forth in claim 1, wherein a background signal at a first point in time is compared to the background signal at a second later point in time to identify the need for calibration.

6. The system as set forth in claim 1, wherein a feature of the background signal is compared to a limit to identify the need for calibration.

7. The system as set forth in claim 1, wherein an ambient condition is sensed, and a change in the background signal caused by a change in the ambient condition is monitored, and a variation in the amount of change to the background signal for a given change in the ambient condition is monitored to identify the need for calibration.

8. The system as set forth in claim 1, wherein said background signal has a frequency range that is monitored over time, and a change in the frequency range is monitored to identify the need for calibration.

9. A system comprising:
a plurality of sensors for sensing the presence of a chemical and a control for analyzing a signal from said sensors, said sensors being operable to send an occurrence signal indicative of a presence of a particular chemical to said control, and said sensors also sending a background signal to said control even without the presence of the particular chemical; and
said control evaluating said occurrence signal to identify the presence of the particular chemical, and evaluating said background signal to identify a need for calibration wherein a change in said background signal is monitored to identify the need for calibration and wherein said control looks to a number of noise spikes in said background signal to identify the need for calibration.

10. A method of monitoring a system comprising the steps of:
sensing for the presence of a particular chemical at a sensor and sending an occurrence signal should the presence of the chemical be detected, and monitoring the signals at a control, and also sending a background signal from the sensor even without the presence of the particular chemical, and evaluating said background signal to identify a need for calibration, and calibrating the sensor should a need be identified;
monitoring a change in said background signal to identify the need for calibration; and
monitoring noise in said background signal and using a change in said noise to identify said need for calibration.

11. The method of monitoring a system as set forth in claim 10, wherein said background signal has an offset and monitoring a change in the offset over time to determine the need for calibration.

12. The method of monitoring a system as set forth in claim 11, wherein said offset changes over time and said control evaluating the amount of change and identifying the need to calibrate when the amount of change increases.

13. The method of monitoring a system as set forth in claim 12, further including the steps of comparing the offset to a limit and identifying said need for calibration should said offset be above said limit.

14. The method of monitoring a system as set forth in claim 10, further including the steps of comparing a background signal at a first point in time to a background signal at a second later point in time to identify the need for calibration.

15. The method of monitoring a system as set forth in claim 10, further including the steps of comparing a feature of the background noise to a limit to identify the need for calibration.

* * * * *